United States Patent [19]
Jones et al.

[11] Patent Number: 5,962,089
[45] Date of Patent: Oct. 5, 1999

[54] AUTOMOTIVE TRIM PANEL AND METHOD OF MAKING SAME

[75] Inventors: Vincent H-H Jones, Lake Orion; David L. Simon, Grosse Pointe Woods, both of Mich.

[73] Assignee: Simco Automotive Trim, Inc., Groesbeck, Mich.

[21] Appl. No.: 08/797,643

[22] Filed: Jan. 31, 1997

[51] Int. Cl.⁶ .................................................. B32B 5/18
[52] U.S. Cl. .................. 428/31; 428/160; 428/424.8
[58] Field of Search .......... 428/31, 160, 424.8; 52/716.5; 293/128

[56] References Cited

U.S. PATENT DOCUMENTS

| | | | |
|---|---|---|---|
| 4,116,893 | 9/1978 | Flanagan | 428/31 X |
| 4,722,541 | 2/1988 | Gray et al. | 428/31 X |
| 4,830,916 | 5/1989 | Fukuda et al. | 428/138 |
| 5,022,943 | 6/1991 | Zaima | 428/116 X |
| 5,073,429 | 12/1991 | Steinke et al. | 428/71 |
| 5,296,068 | 3/1994 | Turner | 428/160 |
| 5,529,742 | 6/1996 | Strapazzini | 264/511 |
| 5,571,355 | 11/1996 | Kornylo | 156/78 |
| 5,582,906 | 12/1996 | Romesberg et al. | 428/308.4 X |
| 5,837,172 | 11/1998 | Pritchard et al. | 264/46.4 |

*Primary Examiner*—Henry F. Epstein
*Attorney, Agent, or Firm*—Dorn, McEachran, Jambor & Keating

[57] ABSTRACT

A trim panel for use in automotive trim applications is made from a laminate of a thermoformable foam layer and an A-side layer made of vinyl or cloth or the like. The laminate is thermoformed to impart permanently the contour of a rigid substrate to which the panel will be attached. The foam layer retains the desired contour without the use of other materials. The A-side material and foam layer may be laminated by an adhesive layer which may be a foam which is flame laminated to the foam layer and A-side layer. The foam layer may be encased by thin layers of polyethylene. Process controls are applied allowing thermoforming of parts to automotive precision.

14 Claims, 4 Drawing Sheets

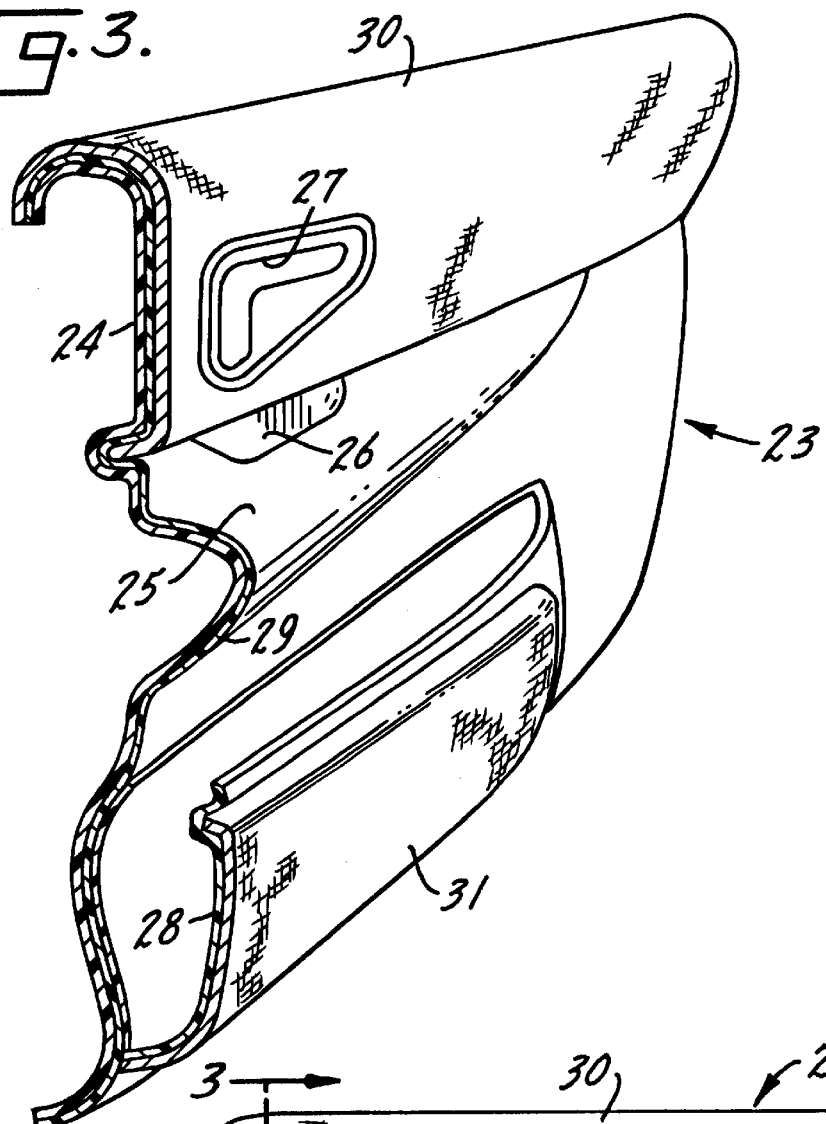
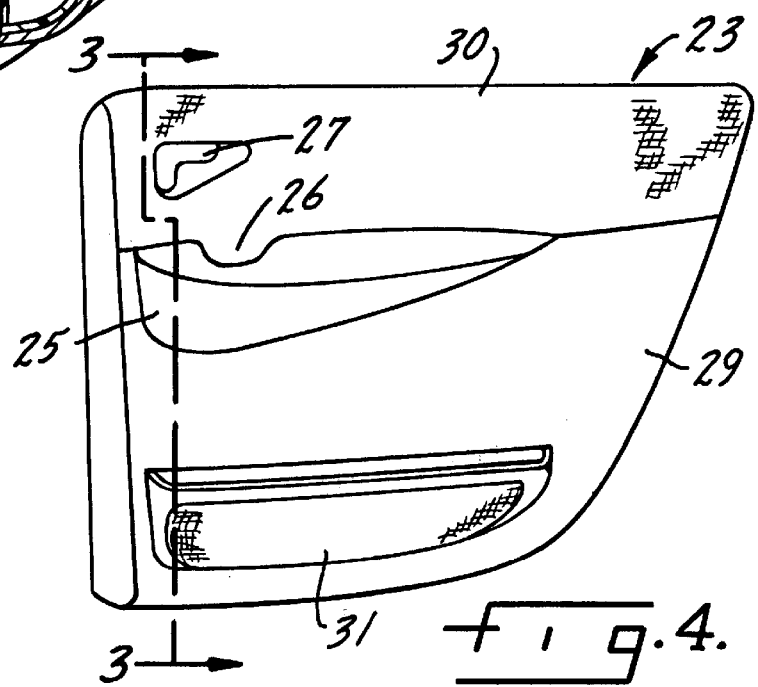

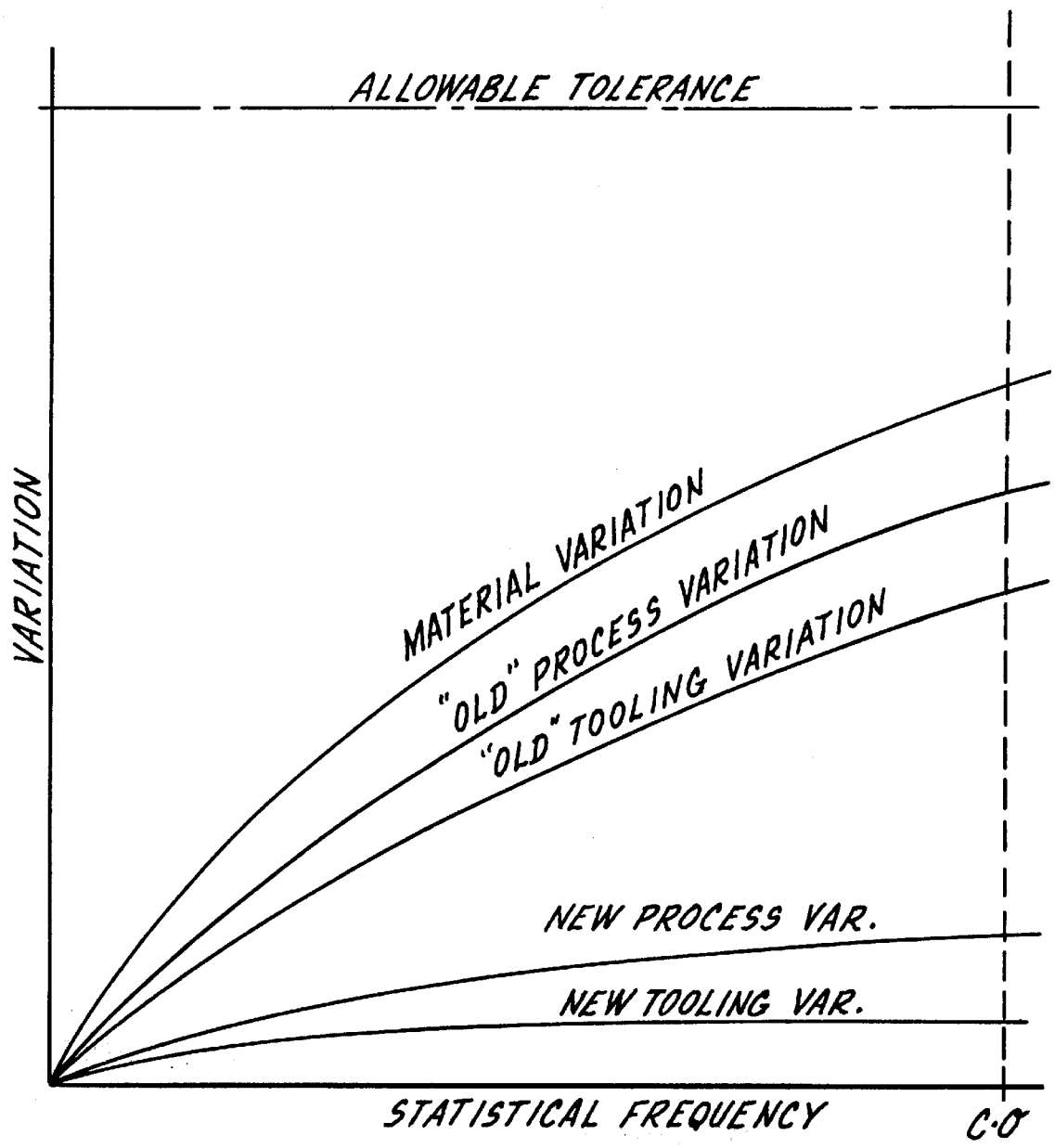

AUTOMOTIVE TRIM PANEL AND METHOD OF MAKING SAME

BACKGROUND OF THE INVENTION

The interior trim appearance of an automobile has been a key area of marketing focus. Interiors are often given treatments which provide increases in perceived value as well as brand differentiation. Efforts to cut costs by removing even small interior trim details have met with significant adverse sales impact.

The current automotive interior styling trend is toward a softer, wrap-around styling vision which places special emphasis on the tactile feel of the interior, as well as the visual impression. The hard plastic substrates and surfaces of car interiors in past years are being replaced by the trend toward padded or cushioned surfaces, covered by either vinyl or textile materials. Accordingly, parts such as instrument panels, arm rests, center consoles, seating, head rests, door skins and body pillar trim have increasingly been provided with soft, padded interior trim for styling purposes, for noise abatement and for safety concerns.

The automotive interior surfaces just described typically comprise a structural substrate of aluminum, plastic or the like which is relatively rigid. A layer of padding and a trim panel may cover the interior surface of the substrate. The term "relatively rigid" as used herein refers to the fact that the substrate has greater stiffness than the trim panel covering it. Obviously some flexibility is found in components such as door panel substrates.

The surface of the trim panel which is exposed to the passenger is referred to as an A-side layer. Typical materials for the A-side layer are leather, vinyl or textile materials, including cloth or carpet. Vinyl materials often have a cotton knit backing and textiles usually have a latex backcoating applied by the fabric manufacturers to stabilize the cloth. While the materials used as A-side layers serve their cosmetic purposes well, none of them by themselves provide the soft, padded or cushioned effect desired, nor will they retain a shape. Accordingly, a layer of padding and structure must be provided between the substrate and the A-side layer.

Current interior trim suppliers are using a variety of methods to apply the A-side layer and padding to the substrates of various interior trim systems. The most common and least technologically advanced method is hand applying the coverings to the substrate. The layers are hand laid over a finished substrate and then pushed, pulled, tucked and pinched into the contour of the substrate. The layers are secured with adhesives and/or mechanical fasteners such as staples or the like. Edge finishing requires additional operations. Obviously hand applied trim panels have high labor costs. Accordingly much effort has been put into alternative methods of trim panel application such as vacuum forming and low pressure molding (LPM). In LPM the trim panel is attached concurrently with the molding of the rigid substrate. While vacuum forming has advantages over hand applying, it still has numerous drawbacks, including slow cycle times, tearing, stretching or thinning of the A-side layer and bridging of the A-side layer over grooves and the like. LPM avoids some of these problems but introduces new ones such as cost, additional trimming, part stability (warping and shrinkage), and uneven fill of the substrate (thin and thick spots). Like vacuum forming LPM suffers from slow cycle times.

What is needed is a trim panel that is padded and pre-formed to the contour of the substrate so it can be attached to the substrate by any method without the need for laborious hand contouring. None of the alternatives mentioned above addresses this need, in part because of the difficulties of forming any shape in A-side materials. The A-side materials on their own lack sufficient stiffness to retain any particular contour or shape, i.e., they will fold or collapse under their own weight.

A known technique for making formed parts is thermoforming. Thermoforming is defined as the forming of a thermoplastic sheet by heating it and then placing it into a mold to shape it. Cooling takes place in the mold so when the part comes out it will be selfsupporting, i.e., it will retain the shape or contour of the mold.

However, not all materials are thermoformable. A-side materials cannot be thermoformed effectively—again, they will not retain a shape or contour. Felt can be thermoformed, as can polypropylene. A-side materials have been combined with layers of felt and polypropylene to make thermoformed parts. But these parts do not have the padded or cushioned feel desired. Trim parts made of such materials would still require separately added layers of foam or other padding. Urethane and polyethylene foams by themselves are thermoformable and thermoformed parts made solely of these materials have been used in automotive applications. But these parts do not have the desired A-side surface treatment. So far as the inventors are aware, no one has ever made trim panels made of a thermoformable foam and an A-side material because there has been a perception that the technical difficulties of controlling the process were beyond reasonable. Specifically, the tendency of A-side materials to exhibit memory (retain their original flat shape and thereby resist molding) and to change their shape after thermoforming due to shrinkage makes them terrible candidates for thermoforming. Thus, A-side materials require a stout backing material to overcome these characteristics. While felt and polypropylene have sufficient rigidity when thermoformed to tame the ornery manners of thermoformed A-side materials, it was always assumed that foam materials would not have the required characteristics to combine with A-side materials. Plus, the danger of having a backing material that would stretch, tear or distort the A-side material counseled against the use of foam in conjunction with A-side materials.

Furthermore, lack of thermoforming process controls made the very notion of "precision" formed textiles and vinyls implausible in the automotive world. It was thought thermoformed textiles and vinyls could not be made in volume with precise, predictable and repeatable results. The common misconceptions among automotive textile people were twofold; first it was thought that the tough body cloths could not be molded as many of them are woven and have extremely well-developed wear characteristics, and secondly, the latex backcoating was so difficult to adhere to that the adhesives would release and the laminates would fail.

The present invention describes a material which overcomes these perceived drawbacks and provides a self-supporting, padded trim panel ready for attachment to a substrate in any desired manner. Process controls are provided which allow thermoforming these parts in quantity with precise, repeatable accuracy.

SUMMARY OF THE INVENTION

The present invention is directed to a new material which is particularly suited for use as an automotive trim panel and a method for making a panel that allows an entire padded vinyl or cloth trim panel to be formed in one operation. The trim panel has an A-side layer laminated to a thermoformable foam layer.

The foam layer is a thermoformable foam, such as urethane foam or polyethylene foam. Either the urethane or polyethylene foam may be either closed or open cell, and may be thermo or chemically cross-linked. A typical range of thickness for the foam layer is about 0.080"–0.320", although the invention is not limited to this range.

The A-side layer may be laminated to the foam layer by an adhesive layer. A preferred adhesive layer is a closed cell urethane foam having an initial thickness greater than 0.100 inches and a density in the range of 2 to 2.5 pounds. The laminate is prepared by flame laminating in a two-pass operation. First, the adhesive layer is heated and applied to the A-side material in a pinch roller. Then the remaining exposed side of the adhesive layer is flamed and the foam layer is added at a pinch roller to complete the laminate.

This laminate of A-side layer and foam layer is thermoformed to impart the contour of the substrate to which the panel will be attached. After thermoforming the foam layer will have sufficient stiffness to retain the contour even though the A-side layer would not do so by itself. Thus, the thermoformed laminate is self-supporting. By self-supporting it is meant that the part retains its shape or contour and will not fold or crumple under its own weight. The part is, of course, flexible but not so much so as to lose its contour. The foam layer also retains its inherent sponginess to provide the cushioned or padded effect desired.

The formed trim panel of the present invention can be applied to a relatively rigid substrate using any of the known techniques. In addition to adhesive or mechanical attachment to an existing substrate, the trim panel could be used in an LPM system by laying it over the male portion of the LPM system for attachment to the substrate. The trim panel affords precise location, stretch and thinning avoidance, and material savings, including the elimination of much of the current waste associated with edge trimming.

In another embodiment the laminate could have an additional layer with the thermoformable foam layer sandwiched between two adhesive layers attaching an A-side layer on one side and a backing layer of felt on the opposite side of the foam layer. Such a construction would have the advantage of the soft, cushioned feel while being stiffer than the laminate of A-side and foam alone.

Another alternate embodiment includes thin layers (on the order of 0.001"–0.002" thick) of polyethylene cast on both sides of the thermoformable foam layer. Thus, the complete laminate from outside in would comprise an A-side layer, a first polyethylene layer, a thermoformable foam layer and a second polyethylene layer.

The thermoforming process itself involves numerous variance reduction efforts in both the production machinery and the production tooling. These include reduced platen deflection, increased platen parallelism, heater system controls, precise material handling, computer controls and precise mold-and-trim in-place tooling. These techniques could be applied to the thermoforming of any materials, not just the A-side plus foam laminate.

BRIEF DESCRIPTION OF THE DRAWINGS

FIG. 3 is a schematic perspective view, with a portion in section, of an automotive interior door panel with the trim panel of the present invention attached thereto. The sectional portion of FIG. 3 is taken along line 3—3 of FIG. 4.

FIG. 4 is a front elevation view, on a reduced scale, of the trim panel of FIG. 3, showing the section line for the view of FIG. 3.

FIG. 5 is a graph illustrating the variance reduction achievable with the process controls of the present invention.

DETAILED DESCRIPTION OF THE INVENTION

High volume production of the padded, self-supporting trim panel of the present invention involves at least three aspects, formation of the laminate which is used as the starting material, thermoforming the laminate, and applying variance reduction techniques during thermoforming to keep the trim panels within tolerance. Each of these three aspects will now be described in detail.

I. Formation of the Laminate

Figure 1:
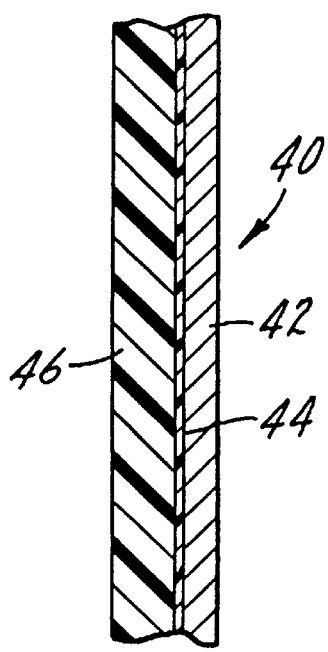
FIG. 1 is a section through a portion of the laminate of the present invention, showing the layers thereof in a preferred embodiment.

A preferred embodiment of the laminate for the present invention is shown generally at 40 in FIG. 1. The laminate comprises an A-side layer 42, an adhesive layer 44 and a foam layer 46. The A-side layer 42 is made of vinyl or textile as described above. The adhesive layer 44 is preferably closed cell urethane foam having an initial thickness greater than 0.100 inches and a density in the range of 2 to 2.5 pounds. The foam layer 46 is a thermoformable foam, such urethane foam or polyethylene foam. Either foam may be either closed or open cell, and may be thermo or chemically cross-linked.

In the past foam adhesives have been limited to an initial thickness of about 0.04" to 0.10" to minimize material cost and maximize ease of application. The inventors herein have found that increasing the initial foam thickness would allow greater liquefying which resulted in greatly improved adhesion with the A-side and foam layers 42 and 46. Thus, the preferred adhesive layer initial thickness is greater than 0.100". Thicknesses of 0.120"and 0.150" have produced vastly improved bond values. For example, the 0.120" foam has pull strengths to delamination ranging from 1.5 pounds up to foam shear (the A-side or foam layer disintegrate before delaminating). The 0.150" foam has pull strengths of 3.0 pounds up to foam shear. This compares to ranges of 0.0 to 1.0 pounds for 0.040" foam, 0.5 to 1.5 pounds for 0.060" foam and 1.0 to 2.5 pounds for 0.090" foam. All of these figures are after a twenty-four hour cure.

The laminate is prepared as follows. A first side of the adhesive layer is heated in a flame laminator and that side is attached in a pinch roller to the A-side material. With the greater thickness adhesive layer, a modicum of foam on the second side of the layer is allowed to remain unmelted foam on the first pass through the pinch roller. Then the second, still-exposed side of the adhesive layer is flamed to melt the remaining adhesive foam for attachment of the foam layer 46 in a second pinch rollers. The finished laminate is placed on rolls, ready for thermoforming.

While FIG. 1 shows a preferred method of bonding the A-side layer to the foam layer, using a flame-laminated adhesive layer, the invention in its broadest aspect concerns an A-side material laminated to a thermoformable foam layer by any suitable technique, which may not require a separate adhesive layer. For example, the foam layer may itself be heated, as in a flame laminator, to liquify a thin portion which will allow the foam layer to be laminated directly to the A-side layer. Sintered lamination could be also be used. Sprayed adhesives could be used. Some of these alternatives are shown below.

II. Thermoforming the Laminate

Figure 2:
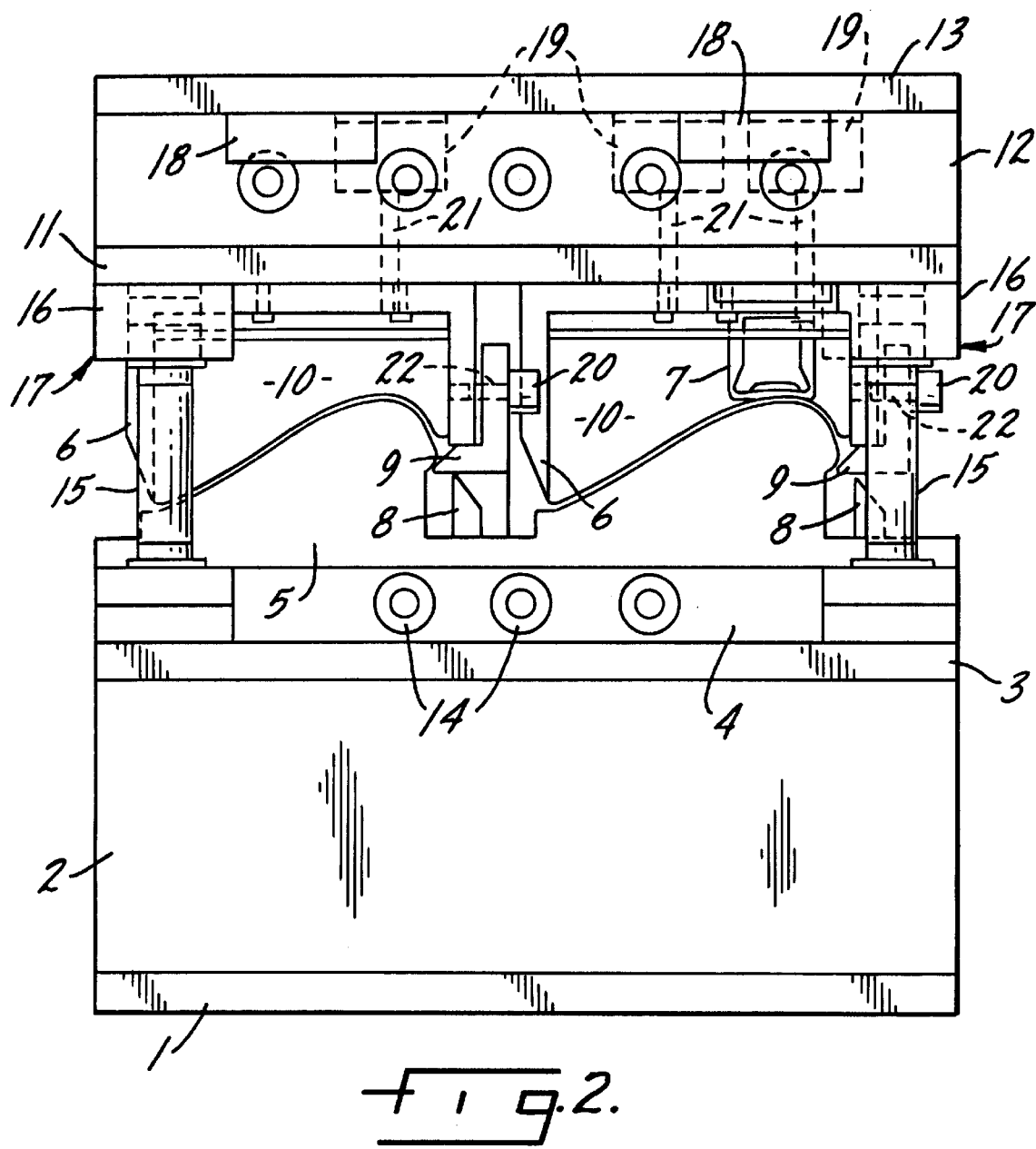
FIG. 2 is a front elevation view of a thermoforming machine with typical tooling shown.

A portion of a typical thermoforming machine is shown in FIG. 2. It will be understood that the machine includes a heater section which is not shown and would be used to heat the laminate prior to entry into the molding section which is shown in FIG. 2. This particular version has dual sets of tooling so two parts are made at once. It also has upper and lower halves, both carried by reciprocable platens.

The lower half of the machine includes a lower press plate 1 supporting a lower riser 2. The lower press plate 1 itself sits on a vertically reciprocable platen (not shown). A lower mounting plate 3 rests on the riser 2 and supports an aluminum cooling block 4 which has a plurality of couplers 14 for connection to cooling water supply hoses (not shown). The lower tooling comprises an anvil 5 and a pair of knife blades 8. The anvil is preferably made of an aluminum-bronze alloy. Four guide pins 15 are located generally near the corners of lower cooling block 4, out of the way of the anvil 5, knife blades 8 and the upper tooling. Thus, the guide pins don't actually interfere with those parts despite the appearance of the drawing. The lower press plate 1, lower riser 2, lower mounting plate 3, cooling block 4, anvil 5, knife blades 8 and guide pins 15 are all fixed relative to one another and they all move up and down with the lower platen.

The upper half of the thermoforming machine includes an upper press plate 13 which is fastened to a vertically reciprocable upper platen (not shown). An upper riser 12 fits under the plate 13. A plurality of air cylinders 19 are located in recesses formed in the riser 12 and have extension rods 21. Air is supplied to the cylinders 19 through an eight-port manifold 18. An upper mounting plate 11 is fastened under the riser 12. Four guide blocks 16 are aligned with the guide pins 15 to form guide pin assemblies 17. The upper mounting plate 11 carries the upper tooling which includes a pair of knives blades 6, cutting blades 7, and upper forms 10 which are also sometimes called strippers. The upper forms 10 are connected to the extension rods 21 of cylinders 19 so that forms 10 can be actuated independently of the movement of the upper platen. Forms 10 can be made of aluminum and may alternately having cooling ducts therein. An opening is provided in the form 10 for knife blade 7. Knife blades 6 and 7 are preferably made of 6150 or 4140 steel, normalized and heat-treated to $R_c$ 43/45. Blades 6 and 7 are bolted to mounting plate 11.

The upper tooling also includes optional edge forming slides 9 which are horizontally actuated by cylinders 20, 22. Edge forming slides are not needed for some parts. The upper press plate 13, upper riser 12, upper mounting plate 11, guide blocks 16, and knife blades 6 and 7 are all fixed relative to one another and they all move up and down with the upper platen. Forms 10 and slides 9, in addition to moving with the upper platen, also can be actuated independently by their respective air cylinders.

The thermoforming process with the tooling of FIG. 2 includes a series of operations starting with heating the flat web of laminate in a heater section and then introducing the heated web between the open halves of the tooling. The platens close bringing upper and lower plates 13 and 1 toward one another. Two concurrent effects of tool closure are the laminate contacts anvil 5 and starts to cool and the lower blade 8 cuts the laminate against upper form 10. Immediately after tool closure two sequential events occur. First, the lower platen retracts allowing the lower blade 8 to retract. Secondly, the forming slide 9 advances and forms a turned edge. Then the tool closes fully and upper blade 6 completes the trim against the anvil 5 upon completion of the cooling cycle. The tool opens slightly which allows forming slide 9 to retract, which it does by moving to an unload position. Finally, the tool opens and the offal is removed and the tool resets for the next cycle.

The tooling and process as described make a part such as an upper bolster for the top portion of an interior door panel. Such a bolster is shown as part of the complete door panel shown generally in FIG. 3 and 4 at 23. The panel includes a relatively rigid substrate 24, which forms no part of the present invention. The substrate defines a contour which includes an arm rest 25, an indentation 26 (forming a door pull) and a door latch opening 27. A rigid substrate 28 for a map pocket is added to the basic substrate 24. The substrate 24 is covered with a skin 29 which is formed in accordance with this invention from a thermoformed foam layer and a vinyl A-side layer. The upper bolster 30, typically with a cloth A-side layer made in accordance with this invention, is added on the top portion of the skin. Similarly, a cloth map pocket insert 31 is applied to the map pocket substrate 28.

III. Variance Reduction

As mentioned above it has heretofor long been believed in the automotive industry that A-side materials could not be reliably laminated to thermoformable foams and then thermoformed into trim parts. Making parts within the allowable tolerance to a desired statistical frequency (represented in FIG. 5 as some constant "c" times the standard statistical certainty symbol "σ") was considered an impossible task. Note that the total tolerance used is a summation of the material, tooling and process tolerances of FIG. 5.

It must be recognized that the materials have a tremendous variance unto themselves. When added to the old tooling and process variances, it was indeed impossible to make parts within tolerance at all. This is indicated in FIG. 5 by the summation at c·σ of the values for the curves labeled material variation, old process variation and old tooling variation. The inventors have employed a variety of techniques to reduce the variance in both process variations and tooling variations. By combining these techniques they have been able to make foam-plus-A-side parts in quantity that meet automotive tolerance requirements. These techniques will now be described.

Platen Deflection: Even the finest tooling will be adversely affected by prior industry standards for allowable deflections in the press itself. In prior thermoforming presses accuracy is sacrificed in the name of reducing cost and speeding up build times of the press. This may have been an outgrowth of thermoforming's genesis in the packaging industry, i.e., when making foam plates and plastic lids and the like minimal press tonnage and accuracy are required. Modern automotive interior trim applications on the other hand require several times the amount of tonnage for complete trimming through tough A-side materials and backings. Accordingly, the platens previously used would deflect between 0.001"–0.005" per foot of platen width or length under load. In the present invention the design is certified at 0.001"–0.002" deflection across the entire platen face under load. The result is less deflection which means greater tool life, greater press life, improved precision and trimming, lower hydraulic pressure and, thus, variance reduction.

Platen Parallelism: Parallelism problems share many of the concerns of the deflection issue. The impact on part variation and tool life of partial planar contact, or phased planar impact at tool closure is dramatic. When this happens the tool is left to deflect or deeply coin as a result of the point or incomplete closure contact. Such incomplete contact is a direct result of non-parallel platens. Prior thermoformers had a parallelism total between platens at closure of between 0.005–0.025" at best. In the present invention total parallelism tolerance is certified at 0.002" maximum under load. This is a significant contributor to consistent, repeatable tool closure and, therefore, variance reduction.

Heater System: Several heater systems are currently available such as natural gas or LP fired or fractured, electric radiant, quartz, contact and hot air systems. The present invention uses multi-zoned (45 zones) electric radiant heater banks, with closely matched resistance. There are also zoned feedback thermocoupled integrated controls to allow precise application of the correct amount of heat to the laminate in the heating section. The electric heater banks are shaped to match the shape of the laminate web. Because bowing or sagging of the web is inherent, the heater banks are similarly bowed to conform to the web shape. Air circulation and control, venting, and handling rail compensation systems, coupled with the shaped array heater assembly all combine to offer fine control and result in variance reduction.

Material Handling System: The handling system employed by the present invention is of heavy structural construction, cooled and shrouded, with the materials being fed in a continuous web. Each side of the web is engaged by a precision pin-chain with the two chains driven by a common index drive system. This promotes the elimination of bind and warp common in blank feed or non-shared drive systems. With multiple width adjustments possible precise tension control upon the web can be maintained in both the press and heater sections of the equipment. A simple feed and drive system with a roll stand tensioning device provide for even feeding and precise indexing. The heavy structural design eliminates rail "whip" and deflection which would otherwise allow the materials to experience tension variations due to sag or drawing tight. Tension variations would produce variations in the forming characteristics. The structural rail, feed, drive and indexing all contribute to variance reduction.

Control System: The computer control of the present invention allows precise monitoring and real time adjustments of heater zones, index lengths, speeds and cycle times. With the added benefits of data collection, process recipe storage and feedback capability the entire process can be tracked, including each time the process was interrupted and the reason(s) therefor. The control system allows repeatable set ups based upon proven recipes, avoiding hand adjustment and the effects of individual operator choices. This helps reduce variation.

Mold and Trim In-place Tooling: The tooling as described above provides three major benefits: durability, accuracy, and process control. Durability is a function of the materials such as the hardened steel blades and bronze anvils, as well as the accuracy with which the tool is made. Accuracy is a result of the CAD/CAM/CAE manufacturing methods used to make the tool. Actual fabrication is completed on multi-axis CNC machines driven from cutter path data generated from the CAD/CAE database. This ties the actual build to the design database, and is then overlaid in the CMM inspection to certify results. Process control in the form of cooling lines and stripper pressure control (springs or air cylinders) allows the laminated materials to be formed in a repeatable manner without damage to the A-side material. The accuracy of the tool also affects the process control.

All of these efforts combine to produce the results illustrated in FIG. 5. The summation at c·σ of the values for the curves labeled material variation plus new process variation plus new tooling variation produce a total that is less than the line marked allowable tolerance. It will be understood that these process controls can be successfully applied to thermoforming any material, not just the A-side plus foam combination described herein.

IV. Alternate Laminate Embodiments

Figure 6:
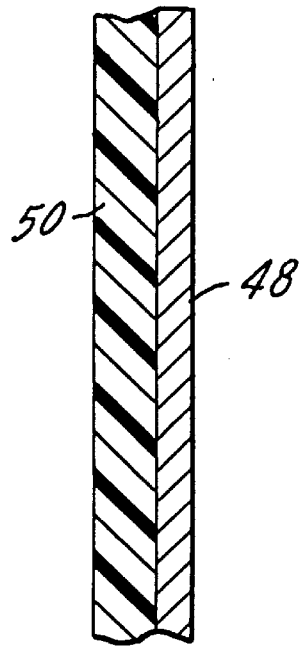
FIGS. 6–9 are views similar to FIG. 1, showing alternate embodiments of a laminate for the present invention. Some of the layers may be shown out of scale thickness for clarity.

FIG. 6 shows an alternate embodiment of a laminate for use in making the panels of the present invention. This is the laminate in its simplest form which comprises just an A-side layer 48 and a thermoformable foam layer 50. As suggested above, this laminate could be made by heating the foam layer to liquify a thin portion which will allow the foam layer to be laminated directly to the A-side layer.

Figure 7:
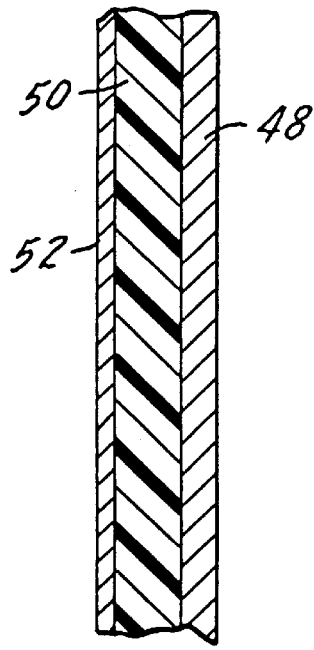

FIG. 7 illustrates a further alternate laminate which starts with the materials of FIG. 6 and adds a backing layer 52 of felt. This has the advantage of providing a stiffer part while still having the desired padded or cushioned feel. The felt can be laminated to the foam layer by any suitable method. Felt is sometimes supplied with adhesive impregnated therein. The heat of laminating can activate this adhesive to make it stick to the foam layer.

Figure 8:
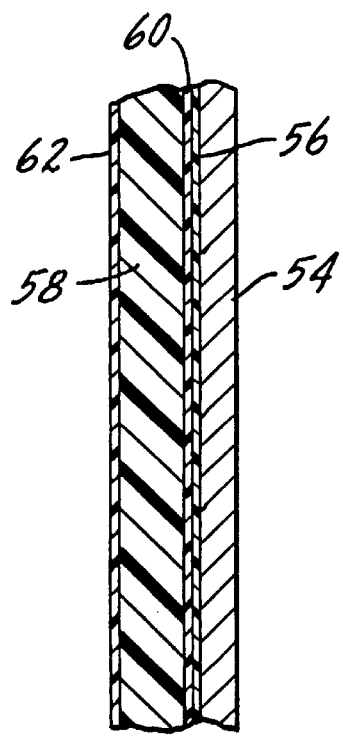

FIG. 8 illustrates a third alternate embodiment that has an A-side layer 54, an adhesive foam layer 56, and a thermoformable foam layer 58. Thin layers 60, 62 of polyethylene film are cast on both sides of the foam layer 58. The polyethylene film is about 0.001"–0.002" thick and provides improved adhesion in the laminate and better release and sliding in the thermoforming tooling. It allows the unformed blank to slide on the tooling with less pull or stretching. The finished part also adheres better to the substrate. Thus, the polyethylene film exhibits the dual properties of being more slippery than the moldable foam at thermoforming temperatures of 350–700° F., while being more adherent than the moldable foam at laminating temperatures in excess of 1000° F. and at assembly with the substrate using an adhesive at room temperature.

Figure 9:
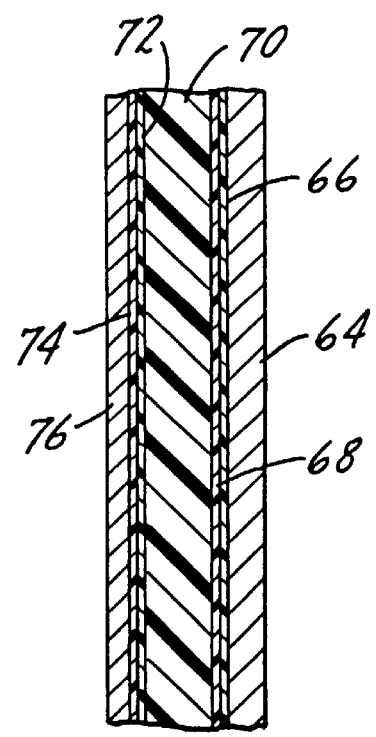

FIG. 9 shows an alternate laminate that combines all of the features described above, namely, an A-side layer 64, an adhesive foam 66, a polyethylene film 68, a thermoformable foam 70, a polyethylene film 72, a second adhesive foam layer 74 and a felt backing layer 76.

While a preferred form of the invention has been shown and described, it will be realized that alterations and modifications may be made thereto without departing from the scope of the following claims.

We claim:

1. A panel for covering a substantially rigid substrate having a non-flat contour, the panel consisting of an A-side layer and a foam layer laminated to one another, the A-side layer by itself having insufficient stiffness to retain a particular shape, and the foam layer having sufficient stiffness to impart to the panel a permanent, non-flat contour generally matching that of the substrate.

2. The panel of claim 1 wherein the foam layer consists of a material selected from the group consisting of urethane foam and polyethylene foam.

3. The panel of claim 1 wherein the A-side layer is vinyl.

4. The panel of claim 1 wherein the A-side layer is a textile material.

5. The panel of claim 1 wherein the foam layer and A-side layer are laminated together by an adhesive foam layer.

6. A panel for covering a substantially rigid substrate having a non-flat contour, the panel being made by the process of laminating together first and second sheets, the first sheet comprising an A-side layer which by itself has insufficient stiffness to retain a particular shape, the second sheet comprising a thermoformable foam layer, and thermoforming the laminated sheets into a non-flat contour generally matching that of the substrate with the foam layer having sufficient stiffness to permanently retain said contour.

7. The panel of claim 6 wherein the foam layer consists of a material selected from the group consisting of urethane foam and polyethylene foam.

8. The panel of claim 6 wherein the A-side layer is vinyl.

9. The panel of claim 6 wherein the A-side layer is a textile material.

10. The panel of claim 6 wherein the foam layer and A-side layer are laminated together by an adhesive foam layer.

11. The panel of claim 6 further comprising a backing layer made of thermoformable material and laminated to the foam layer such that the foam layer is between the A-side layer and the backing layer.

12. The panel of claim 6 further comprising a polyethylene film on at least one side of the foam layer.

13. An automotive trim panel for covering a substantially rigid substrate having a non-flat contour, the panel comprising an A-side layer and a foam layer laminated to one another, the A-side layer by itself having insufficient stiffness to retain a particular shape, and the A-side and foam layers being thermoformed such that the foam layer will have sufficient stiffness to impart to the panel a permanent, non-flat contour generally matching that of the substrate.

14. An automotive trim panel for covering a substantially rigid substrate having a non-flat contour, the panel comprising an A-side layer, a foam layer and a backing layer laminated to one another with the foam layer between the A-side layer and the backing layer, the A-side layer by itself having insufficient stiffness to retain a particular shape, and the A-side, foam and backing layers being thermoformed such that the backing layer will have sufficient stiffness to impart to the panel a permanent, non-flat contour generally matching that of the substrate.

\* \* \* \* \*